(12) United States Patent
Li et al.

(10) Patent No.: US 12,328,001 B1
(45) Date of Patent: Jun. 10, 2025

(54) METHOD AND SYSTEM FOR DISPATCHING MULTIPLE ENERGY SOURCES IN INTEGRATED ENERGY SYSTEM

(71) Applicant: SHANDONG UNIVERSITY, Jinan (CN)

(72) Inventors: Ke Li, Jinan (CN); Shi Zhang, Jinan (CN); Chenghui Zhang, Jinan (CN); Yu Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/006,404

(22) Filed: Dec. 31, 2024

(30) Foreign Application Priority Data

Jan. 8, 2024 (CN) .......................... 202410033269.3

(51) Int. Cl.
H02J 3/00 (2006.01)

(52) U.S. Cl.
CPC ............. H02J 3/00 (2013.01); *H02J 2203/20* (2020.01)

(58) Field of Classification Search
CPC ................................ H02J 3/00; H02J 2203/20
See application file for complete search history.

(56) References Cited

U.S. PATENT DOCUMENTS

| | | | | |
|---|---|---|---|---|
| 2009/0099832 A1* | 4/2009 | Nasle | ....................... | G06F 30/20 703/18 |
| 2009/0113049 A1* | 4/2009 | Nasle | ....................... | G06N 7/06 709/224 |
| 2012/0191439 A1* | 7/2012 | Meagher | ................. | G06Q 50/00 703/18 |
| 2012/0191440 A1* | 7/2012 | Meagher | ................. | G06F 30/00 703/18 |
| 2013/0253718 A1* | 9/2013 | Meagher | ................. | G05B 17/02 700/291 |

(Continued)

FOREIGN PATENT DOCUMENTS

| CN | 111082417 A | 4/2020 |
|---|---|---|
| CN | 111313445 A | 6/2020 |

(Continued)

*Primary Examiner* — Ziaul Karim
(74) *Attorney, Agent, or Firm* — IPRO, PLLC

(57) ABSTRACT

A method and system for performing analysis and calculation of multi-energy flow for integrated energy system (IES), comprising establishing electrical power flow model, hydraulic model and thermal model, to form preliminary model of IES; constructing DHL-LSTM neural network for nonlinear regression of electrical power flow model, construct SHL-LSTM neural network for nonlinear regression of hydraulic model, and finding optimal parameters of two neural networks; training the two models, and adding error compensations into the two models; simplifying the thermal model, to obtain mechanism-driven linear thermal mode; and embedding mechanism-driven linear thermal model into error-compensated hydraulic model and error-compensated electrical power flow model respectively, to form and use final model of the IES to perform analysis and calculation of multi-energy flow. The present invention fully considers the coupling property inside the system, and avoids the situation that the convergence speed is slowed down when solving high nonlinear problems.

8 Claims, 5 Drawing Sheets

(56) References Cited

U.S. PATENT DOCUMENTS

| | | | |
|---|---|---|---|
| 2013/0253898 A1* | 9/2013 | Meagher | G06N 20/00 703/18 |
| 2014/0136178 A1* | 5/2014 | Meagher | G06N 20/00 703/18 |
| 2016/0196375 A1* | 7/2016 | Nasle | G06F 30/20 703/18 |
| 2016/0247065 A1* | 8/2016 | Nasle | G06N 5/02 |
| 2017/0046458 A1* | 2/2017 | Meagher | G06F 30/20 |
| 2017/0177756 A1* | 6/2017 | Martin | G06F 30/20 |

FOREIGN PATENT DOCUMENTS

| | | |
|---|---|---|
| CN | 113824119 A | 12/2021 |
| CN | 113901653 A | 1/2022 |
| CN | 115169710 A | 10/2022 |
| CN | 115456287 A | 12/2022 |
| WO | 2021003843 A1 | 1/2021 |

\* cited by examiner

METHOD AND SYSTEM FOR DISPATCHING MULTIPLE ENERGY SOURCES IN INTEGRATED ENERGY SYSTEM

CROSS-REFERENCE TO RELATED APPLICATIONS

This application claims priority benefits to Chinese Patent Application number 202410033269.3, entitled "A Method and System for Performing Analysis and Calculation of Multi-energy Flow for Integrated Energy System", filed on Jan. 8, 2024. The entirety of each of the above-mentioned patent applications is hereby incorporated by reference herein and made a part of this specification.

TECHNICAL FIELD

The present invention belongs to the technical field of integrated energy systems, and particularly relates to a method and system for dispatching multiple energy sources in an integrated energy system.

BACKGROUND

The statements in this section merely provide background information related to the present invention and do not necessarily constitute prior art.

An Integrated Energy System (IES), which can effectively improve energy utilization while meeting diversified energy needs, thereby promoting sustainable energy development, has been proposed to address the shortcomings of traditional energy systems, such as supply barriers, insufficient energy utilization and serious environmental pollution. And, coordinated management and complementary and mutually beneficial among various energy sources can be realized in the IES by reasonably arranging various energy resources, conversion devices, and storage devices in a certain area through advanced technology and management methods.

Multi-energy flow calculation and analysis is an important part of optimization and planning of IES to ensure the safe and reliable operation of the system, and there are mainly two aspects of related research, modeling methods and solution algorithms. Wherein, the traditional independent modeling method is based on the mechanism of each energy subsystem, which has high nonlinearity and deep coupling. The traditional solution algorithm is based on Newton-Raphson method, which includes unified solution method and decomposition solution method, by changing the iteration law; however, when calculating the energy flow of large-scale IES, there are problems such as long solution time and difficult convergence of result. In order to realize the fast calculation of multi-energy flow, some researches put forward mechanism-driven modeling method and data-driven modeling method, which shorten the calculation time to some extent. However, the linear fitting regression is carried out by using linearization or mathematical statistics methods from a mechanistic perspective under the simplification of system conditions, but the calculation accuracy is low, and then the operation analysis of the whole system is affected.

At present, the research on energy flow calculation of independent electrical power system and independent thermal system has been relatively mature. As the representative of rapid development in energy field, the research on energy flow calculation of the electrical power system has achieved a lot, including Alternating-current (AC) power flow calculation and Direct-current (DC) power flow calculation. However, the high nonlinearity in AC power flow calculation also makes the solution process complex and the convergence speed slow. To solve this problem, the fast power flow calculation of the electrical power system has become the goal of research, and it is currently mainly carried out from two aspects: statistical method and deep learning, which can realize linear regression and mine its nonlinear characteristics through the deep learning, and achieve good result. Therefore, for the multi-energy flow calculation of electric/thermal IES, in addition to considering high nonlinearity, it is also necessary to fully consider the coupling relationship between heterogeneous energy systems.

In the existing research, most of them are still based on traditional modeling methods and solving algorithms for multi-energy flow calculation and analysis, and with the increase of the scale of the IES, the computational complexity is gradually increased; some studies are linear modeling of the electric/thermal IES from mechanism-driven and data-driven, and the calculation accuracy cannot be guaranteed. That is because although mechanism-driven has theoretical support and strong solvability, the knowledge mechanism of large-scale complex problems is not clear and continuous learning evolution is difficult; although data-driven can continuously learn evolution without precise modeling, it lacks interpretability and relies on high-quality data.

SUMMARY

In order to solve that problems, the present invention provide a method and system for dispatching multiple energy sources in IES, which fully considers the couple property inside the IES and simultaneously avoids the condition that the convergence speed is slowed down when solving a highly nonlinear problem.

According to some embodiments, the present invention adopts the following technical solutions.

A method for dispatching multiple energy sources in IES, comprising the following steps:

establishing an electrical power flow model, a hydraulic model and a thermal model based on a structure of an IES, to form a preliminary model of the IES; wherein, the structure of the IES is of an electric-thermal interconnection system, comprises a thermal network, an electrical power network connected with a large power grid, and a CHP (combined heat and power) unit connecting the thermal network and the electrical power network together;

constructing a double-hidden-layer (DHL) long short-term memory (LSTM) neural network for nonlinear regression of the electrical power flow model by considering complex nonlinear characteristics within the electrical power network; performing sequential calculations on the hydraulic model and the thermal model divided from the thermal network, to reduce complexity of a thermal network energy flow model; constructing a single-hidden-layer (SHL) LSTM neural network for nonlinear regression of hydraulic model, and finding optimal parameters of the DHL-LSTM neural network and the SHL-LSTM neural network by Adam (Adaptive Moment Estimation);

training the electrical power flow model and the hydraulic model by using historical data, obtaining regression error data by using the trained electrical power flow model and hydraulic model; constructing error compensation regression models driven by the LSTM neural networks, for adding error compensation to the electrical power flow model and the hydraulic model, respectively;

obtaining a mechanism-driven linear thermal model by simplifying the thermal model;

embedding the mechanism-driven linear thermal model into the error-compensated hydraulic model and the error-compensated electrical power flow model to form a final model for the IES;

performing multi-energy flow calculation and analysis by inputting parameter variables of current load demand of the IES into the final model of the IES, outputting physical parameter values for current energy sources dispatching of the electrical power network and physical parameter values for current energy sources dispatching of the thermal power network; and providing, by a coupling device of the CHP unit in the electric-thermal interconnection system, thermal power to the thermal network according to the output physical parameter values for current energy sources dispatching of the thermal power network; then, calculating electrical power output by the coupling device according to a thermoelectric ratio of the CHP unit, providing the calculated electrical power to the electrical power network from a coupling node where the coupling device of the CHP unit connecting to the electrical power network, and dispatching electrical power energy from the large-scaled power grid to the electrical power network according to the output physical parameter values for current energy sources dispatching of the electrical power network, to balance energy of the electrical power network.

As an alternative implementation mode, the electrical power flow model comprises an expression of active power deviation of node and an expression of reactive power deviation of node.

As an alternative implementation mode, the hydraulic model comprises an expression of flow rate of node and an expression of flow rate of loop.

As an alternative implementation mode, the thermal model comprises an expression of a thermal power vector consumed by or supplied to a node, an expression of a nodal temperature at an end of pipeline section, and an expression of a heating medium temperature of node.

As an alternative implementation mode, a process of simplifying the thermal model comprises: ignoring heat loss in the transmission process, setting nodal temperatures of a water-supply network and a backwater network to constant values, and obtaining the linear thermal model.

As an alternative implementation mode, a process of acquiring the historical data comprises: setting a random factor, generating random electric load and thermal load based on a Monte Carlo method, obtaining a flow result through simulation, deleting data exceeding a critical value of system safety set, and normalizing to form the historical data.

As an alternative implementation mode, both the DHL-LSTM neural network and the SHL-LSTM neural network are of multiple-input multiple-output network structures, and both comprise a forgetting gate, an updating gate and an output gate.

As an alternative implementation mode, a process of introducing error compensation comprises: dividing the historical data into two parts: an electrical power part and a hydraulic part; constructing a training set and a test set for the electrical power part and a training set and a test set for the hydraulic part, respectively; independently training the electrical power flow model and the hydraulic model constructed by the LSTM network, and finding best parameters of the two models (networks) through Adam, and obtaining an electrical power regression model and a hydraulic regression model, respectively; then, performing difference between preliminary regression result output by the electrical power regression model and true values, to obtain electrical power regression error data; combining and arranging the electrical power regression error data with the electrical power historical data into a data set, and dividing the data set in an error training set and an error test set of the electrical power; and then, training an error compensation regression model constructed by the LSTM neural network by using the error training set and the error test set of the electrical power, to obtain an electrical power error compensation regression model; and simultaneously, performing difference between preliminary regression result output by the hydraulic regression model and true values, to obtain hydraulic regression error data; combining and arranging the hydraulic regression error data with the hydraulic historical data into a data set, and dividing the data set in an error training set and an error test set of the hydraulic; and then, training an error compensation regression model constructed by the LSTM neural network by using the error training set and the error test set of the hydraulic, to obtain a hydraulic error compensation regression model.

A system for dispatching multiple energy sources in IES, comprising:

a preliminary model establishing module, configured to establish an electrical power flow model, a hydraulic model and a thermal model based on a structure of an IES, to form a preliminary model for the IES; wherein, the structure of the IES is of an electric-thermal interconnection system, comprises a thermal network, an electrical power network connected with a large-scaled power grid, and a CHP unit connecting the thermal network and the electrical power network together;

a nonlinear regression module, configured to construct a DHL-LSTM neural network for nonlinear regression of the electrical power flow model, construct a SHL-LSTM neural network for nonlinear regression of the hydraulic model, and find best parameters of the two LSTM neural networks;

a data driving module, configured to train the electrical power flow model and the hydraulic model by using historical data, and add error compensations to the two models, respectively, in training;

a mechanism driving module, configured to simplify the thermal model to obtain a mechanism-driven linear thermal model; and a data-mechanism driving joint module, configured to embed the mechanism-driven linear thermal model into the error-compensated hydraulic model and the error-compensated electrical power flow model to form a final model for the IES;

wherein, inputting parameter variables of current load demand of the IES into the final model of the IES to perform multi-energy flow calculation and analysis, outputting physical parameter values for current energy sources dispatching of the electrical power network and physical parameter values for current energy sources dispatching of the thermal power network; and providing, by a coupling device of the CHP unit in the electric-thermal interconnection system, thermal power to the thermal network according to the output physical parameter values for current energy sources dispatching of the thermal power network; then, calculating electrical power output by the coupling device according to a thermoelectric ratio of the CHP unit, providing the calculated electrical power to the electrical power network from a coupling node where the coupling device of the CHP unit connecting to the electrical power network, and dispatching electrical power energy from the large-scaled power grid to the electrical power network according to the output physical parameter values for current energy sources dispatching of the electrical power network, to balance energy of the electrical power network.

A non-transitory computer-readable storage medium, storing computer instructions thereon, wherein when the computer instructions are executed by a processor, performing the steps of the method described above.

An electronic device, comprising a memory, a processor, and computer instructions stored on the memory and running on the processor, wherein when the computer instructions are executed by the processor, performing the steps of the method described above.

Compared with the prior art, the present invention has the beneficial effects that:

According to the present invention, the LSTM neural network is introduced to develop the nonlinear characteristics inside the system and the dependence and correlation among system nodes by utilizing the characteristics of this network, to realize more accurate nonlinear regression.

According to the present invention, accurate modeling is not required, and data-driven modeling is adopted for the electrical power flow model and the hydraulic model with strong nonlinearity, so that the models can continuously evolve and learn, large-scale complex problems with unclear mechanisms are ignored, and the convergence speed problem of nonlinear iterative solution is avoided; and in order to increase the interpretability of the system, the mechanism-driven linear thermal model is embedded.

According to the present invention, In the data preprocessing part, errors of data samples are reduced by sorting historical data through constraint conditions; meanwhile, in order to compensate errors in training and learning of the neural network models, an error correction part is respectively added to the data-driven hydraulic model and the data-driven electrical power flow model, to avoid error stacking of the models, and precision of the regression model is further improved.

In order to make the above objectives, features, and advantages of the present invention more obvious and understandable, the following preferred embodiments are presented in detail with the accompanying drawings.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
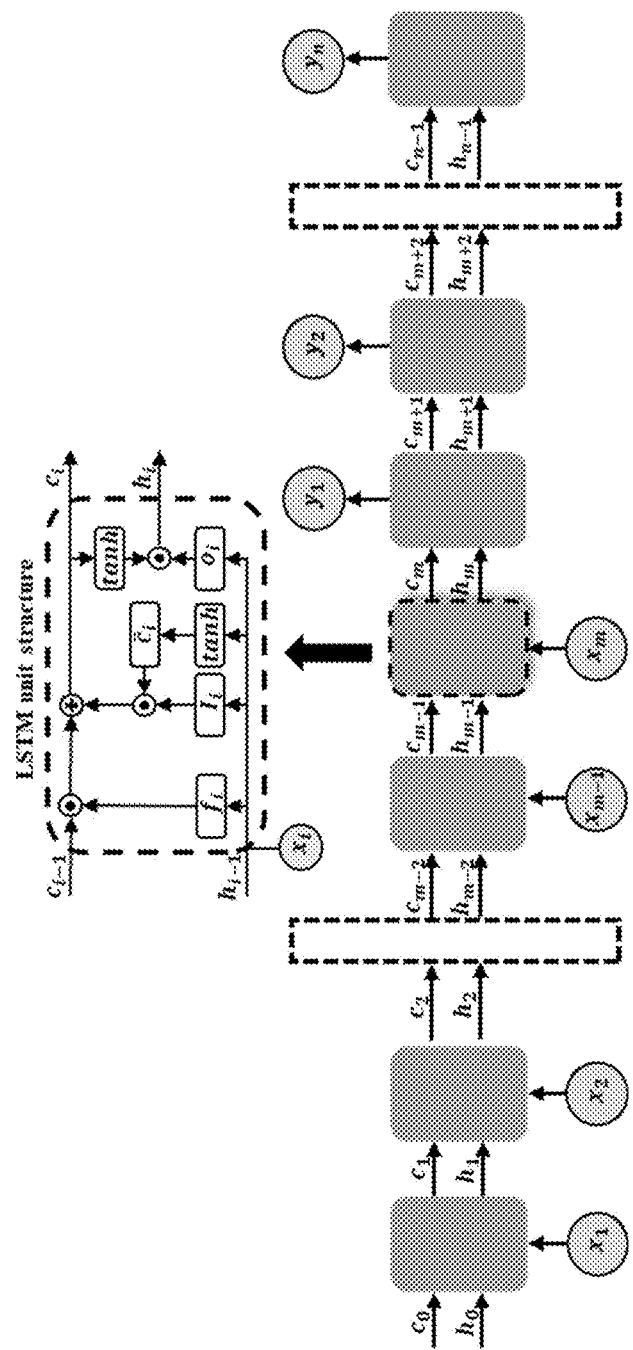
FIG. 1 is a structural diagram of a multi-input multi-output LSTM model adopted in embodiments of the present invention.

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

Embodiment 1

A method for dispatching multiple energy sources in an electric/thermal IES based on data-mechanism joint driving, comprising the following steps:

Step 1: based on a structure of an electric/thermal IES, establishing respectively an electrical power flow model and a thermal system model by using a simulation platform, to form a preliminary model of the IES; wherein, a CHP unit in the IES is used to perform energy conversion, to realize an internal coupling of the IES.

Step 2: acquiring historical data, wherein: generating a large number of random electric load values and thermal load values by setting a random factor and based on a Monte Carlo method, bringing the values into the models established by the simulation platform to obtain a large number of multi-energy flow calculation result, and screening the historical data through safety constraints to improve data quality.

Step 3: performing normalization preprocessing on data samples before model training to improve an accuracy of LSTM.

Step 4: dividing the historical data into two parts: an electrical power part and a hydraulic part; constructing a training set and a test set for the electrical power part and a training set and a test set for the hydraulic part, respectively; independently training the electrical power flow model and the hydraulic model constructed by the LSTM network, and finding best parameters of the two models (networks) through Adam, and obtaining an electrical power regression model and a hydraulic regression model, respectively; then, performing difference between preliminary regression result output by the electrical power regression model and true values, to obtain electrical power regression error data; combining and arranging the electrical power regression error data with the electrical power historical data into a data set, and dividing the data set in an error training set and an error test set of the electrical power; and then, training an error compensation regression model constructed by the LSTM neural network by using the error training set and the error test set of the electrical power, to obtain an electrical power error compensation regression model; and simultaneously, performing difference between preliminary regression result output by the hydraulic regression model and true values, to obtain hydraulic regression error data; combining and arranging the hydraulic regression error data with the hydraulic historical data into a data set, and dividing the data set in an error training set and an error test set of the hydraulic; and then, training an error compensation regression model constructed by the LSTM neural network by using the error training set and the error test set of the hydraulic, to obtain a hydraulic error compensation regression model.

In practical application, first of all, inputting electrical power input data (e.g., electric load) to an electrical power primary regression model and inputting hydraulic input data (e.g., thermal load) to a hydraulic primary regression model, to obtain a voltage and a phase angle of PQ node (P represents active power, Q represents reactive power, the PQ node is also known as a load node), a phase angle of PV node (Power and Voltage Controlled Node) and a mass flow of pipeline;

then, inputting the input and output of the electrical power primary regression model as input data into the electrical power error compensation regression model, to obtain an electrical power error compensation value; inputting the input and output of the hydraulic primary regression model as input data into the hydraulic error compensation regression model, to obtain a hydraulic error compensation value; and finally, using the electrical power error compensation value to correct the error in the electrical power preliminary regression result and using the hydraulic error compensation value to correct the error in the hydraulic preliminary regression result, obtaining the final result, and avoiding error stacking in the overall calculation process.

Step 5: because the heat loss of heating network is usually insignificant, ignoring the heat loss in the process of energy flow transmission, setting the node temperatures of water-supply network and backwater network to a constant value, thus obtaining a mechanism-driven linear thermal model.

Step 6: establishing dual-drive model architecture based on a model block idea. In order to compensate for the shortcomings of data-driven and mechanism-driven, the mechanism-driven linear thermal model is embedded respectively into the data-driven error-compensated hydraulic model and the data-driven error-compensated electrical power flow model, to obtain the final model of IES.

Step 7: inputting parameter variables of current load demand of the IES into the final model of the IES, performing multi-energy flow calculation and analysis, and outputting physical parameter values for current energy sources dispatching of the electrical power network and physical parameter values for current energy sources dispatching of the thermal power network; wherein, providing, by a coupling device of the CHP unit in the electric-thermal interconnection system, thermal power to the thermal network according to the output physical parameter values for current energy sources dispatching of the thermal power network; then, calculating electrical power output by the coupling device according to a thermoelectric ratio of the CHP unit, providing the calculated electrical power to the electrical power network from a coupling node where the coupling device of the CHP unit connecting to the electrical power network, and dispatching electrical power energy from the large-scaled power grid to the electrical power network according to the output physical parameter values for current energy sources dispatching of the electrical power network, to balance energy of the electrical power network.

The following is a detailed introduction, and first of all, the model construction in the first step, comprising:

AC power flow model of power system:

$$\Delta P_i = P_i^{SP} - V_i \Sigma_{j \in i} V_j (G_{ij} \cos \theta_{ij} + B_{ij} \sin \theta_{ij}),$$

$$\Delta Q_i = Q_i^{SP} - V_i \Sigma_{j \in i} V_j (G_{ij} \sin \theta_{ij} - B_{ij} \cos \theta_{ij});$$

where, $P_i^{SP}$ and $Q_i^{SP}$ respectively are the active power and the reactive power of node, $\Delta P_i$ and $\Delta Q_i$ respectively are active power deviation and reactive power deviation of node; $V_i$ is node voltage, $\theta_{ij}$ is phase angle of node voltage; $G_{ij}$ and $B_{ij}$ respectively are the conductance and susceptance of branch.

Hydraulic Model:

$$A_h \dot{m} = \dot{m}_q,$$

$$B_h K_h \dot{m} |\dot{m}| = 0;$$

where, $A_h$ is the node correlation matrix, m is the mass flow rate of pipeline section, $\dot{m}_q$ is the mass flow rate of node, $B_h$ is the loop correlation matrix, and $K_h$ is the coefficient vector.

Thermal Model:

$$\Phi = c_p \dot{m}_q (T_s - T_o),$$

$$T_{end} = (T_{start} - T_a) e^{-\frac{\lambda L}{c_p \dot{m}}} + T,$$

$$(\Sigma \dot{m}_{out}) T_{out} = \Sigma (\dot{m}_{in} T_{in});$$

where, $\Phi$ is the thermal power vector consumed by or supplied to the node, $c_p$ is the specific heat capacity of water, $\dot{m}_q$ is the mass flow rate of heat load supplied by the node, $T_s$ and $T_o$ respectively are the temperature of water supply and outlet water of the node; $T_{start}$ and $T_{end}$ respectively are the temperatures of the nodes at the beginning and end of the pipeline section, $T_a$ is the ambient temperature, $\lambda$ is the total heat transfer coefficient, L is the length of the pipeline section; $T_{out}$ is the heat medium temperature of node, $T_{in}$ is the heat medium temperature at the end of each pipeline section flowing into the node.

Linearizing the Thermal Model Based on Reasonable Assumptions:

(1) For the whole thermal network, the heat loss in the heating network is small, so the heat loss in the transmission process is ignored;

(2) After ignoring heat loss, the temperature of the water supply node and the backwater node is set to a constant value.

The linear thermal model is as follows:

$$(\Sigma \dot{m}_{mn}^{out}) T_{const}^{out} = \Sigma (\dot{m}_{min}^{in} T_{const}^{in}),$$

$$\Phi = c_p A_h \dot{m}_q (T_s^{const} - T_o);$$

where, $T_{const}^{out}$ is the constant heat medium temperature of the node (C), $\dot{m}_{mn}^{out}$ mass flow rate of each pipeline section flowing out of the node (kg/s), $T_{const}^{in}$ is the constant heat medium temperature at the end of each pipeline section flowing into the node (C), and $\dot{m}_{min}^{in}$ is the mass flow rate of each pipeline section flowing into the node (kg/s).

The CHP unit is a gas turbine CHP unit, and the relationship between thermal power production and electrical power production is shown as follows:

$$c_m = \frac{\Phi_{CHP}}{P_{CHP}};$$

where, $\Phi_{CHP}$ is the output thermal power of the CHP unit, $P_{CHP}$ is the output electrical power of the CHP unit, and the output power varies according to the fuel input rate, and $c_m$ is the thermoelectric ratio.

Thus, in some embodiments, the fifth step may be the second step, or may be combined with the first step.

LSTM Neural Network:

Recurrent neural network (RNN) is a neural network that can process sequence data well. After the information of the front sequence is processed by the neural network, it is transmitted to the information of the rear sequence as input information, which can make up for the deficiency that the fully connected network cannot pay attention to the correlation and dependence between data.

However, when traditional RNN is used for multi-input and multi-output data samples, the information weight will decrease when the front sequence information is transmitted to the rear, and there is a problem that the gradient disappears and the minimum value of the loss function cannot be found in reverse solution. The LSTM contains three gate structures: forgetting gate, updating gate and output gate, whose functions are to selectively discard unimportant information in the front information, determine important information recorded in memory cells and select information that needs to be output, and to reduce the loss of information by adjusting the activation function. Gated Recurrent Unit (GRU), as a "lightweight LSTM network", speeds up training and learning by reducing the number of gate structures and parameters, but for large-scale complex data, LSTM networks are still better.

In the present embodiment, aiming at the electric-thermal interconnection IES, data-driven modeling is performed on the electrical power flow model with high nonlinearity and the hydraulic model by constructing the DHL-LSTM network and the SHL-LSTM network respectively, so that the difficult problem of complex and unclear internal mechanism is avoided, and the model can be continuously evolved by learning.

According to the nonlinear characteristics of the electrical power flow model and hydraulic model, networks suitable for the two models are established respectively, and the single hidden layer and double hidden layer refer to numbers of the hidden layers here. FIG. 1 is a schematic diagram of the LSTM network structure.

Figure 2:
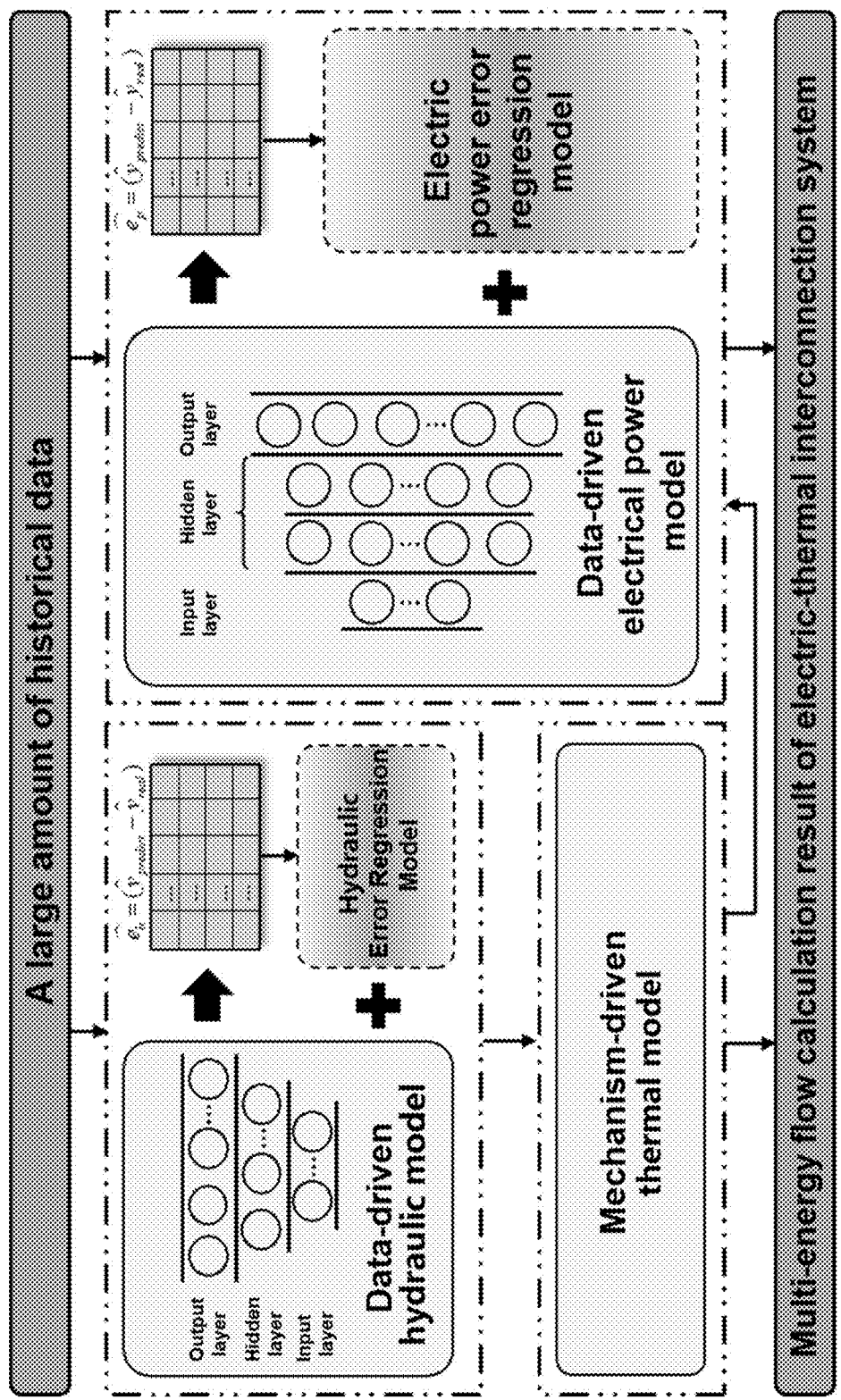
FIG. 2 is an architecture diagram of data-mechanism joint driving according to embodiments of the present invention.

As shown in FIG. 2, embedding mechanism-driven thermal model increases the interpretability of the model through constraints of general physical principal, thereby reducing possible over-fitting caused by data driving and improving model generalization. However, each sub-block model has a certain regression error, which will cause the accumulation of errors when calculate according to a certain order. Therefore, the error compensation is carried out for the two data-driven models respectively, and the error correction part of neural network learning training is added.

First of all, dividing the historical data into two parts: an electrical power and a hydraulic part; constructing a training set and a test set for the electrical power part and a training set and a test set for the hydraulic part, respectively; independently training the electrical power flow model and the hydraulic model constructed by the LSTM network, to obtain an electrical power regression model and a hydraulic regression model, respectively; then, performing difference between preliminary regression result output by the electrical power regression model and true values, to obtain electrical power regression error data; combining and arranging the electrical power regression error data with the electrical power historical data into a data set, and dividing the data set in an error training set and an error test set of the electrical power; and then, training an error compensation regression model constructed by the LSTM neural network by using the error training set and the error test set of the electrical power, to obtain an electrical power error compensation regression model; and simultaneously, performing difference between preliminary regression result output by the hydraulic regression model and true values, to obtain hydraulic regression error data; combining and arranging the hydraulic regression error data with the hydraulic historical data into a data set, and dividing the data set in an error training set and an error test set of the hydraulic; and then, training an error compensation regression model constructed by the LSTM neural network by using the error training set and the error test set of the hydraulic, to obtain a hydraulic error compensation regression model.

Figure 3:
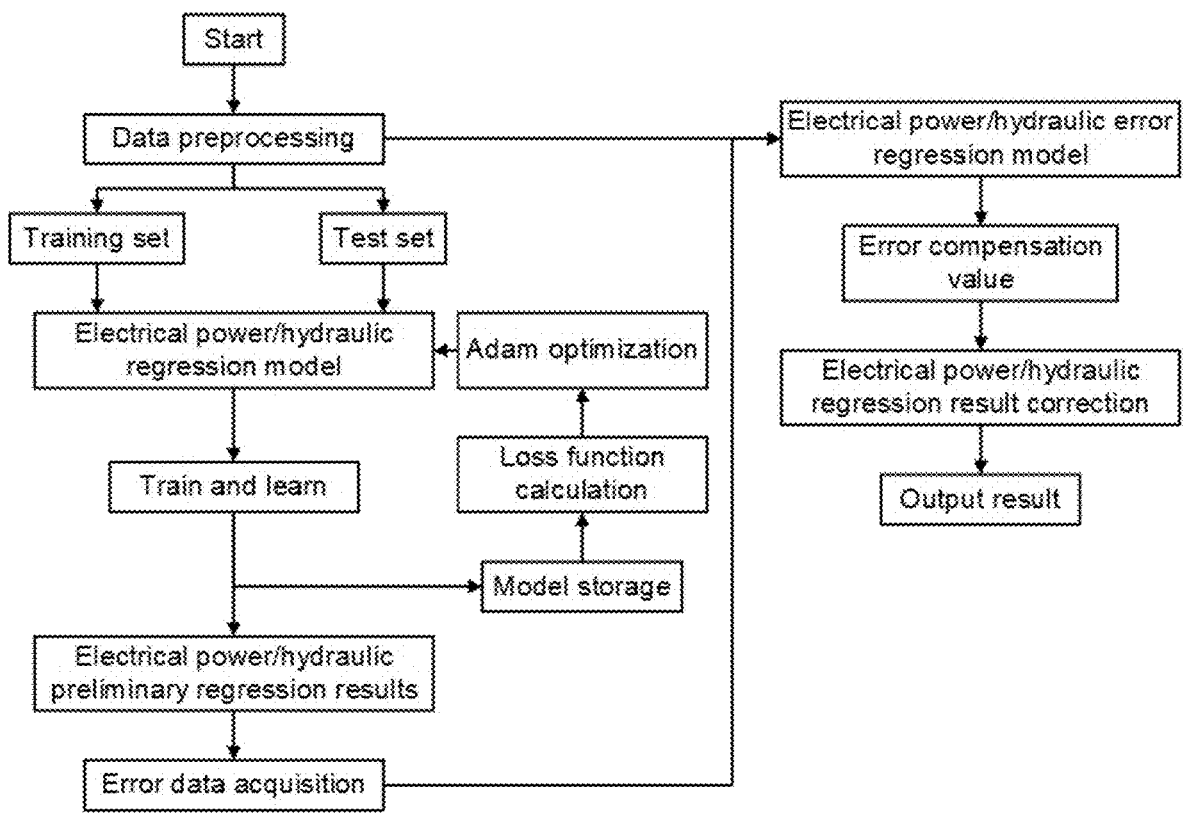
FIG. 3 is a flowchart of a data driving module according to embodiments of the present invention.

In practical application, first of all, inputting electrical power input data (e.g., electric load) to an electrical power primary regression model and inputting hydraulic input data (e.g., thermal load) to a hydraulic primary regression model, to obtain a voltage and a phase angle of PQ node, a phase angle of PV node and a mass flow of pipeline;

then, inputting the input and output of the electrical power primary regression model as input data into the electrical power error compensation regression model, to obtain an electrical power error compensation value; inputting the input and output of the hydraulic primary regression model as input data into the hydraulic error compensation regression model, to obtain a hydraulic error compensation value; and finally, using the electrical power error compensation value to correct the error in the electrical power preliminary regression result and using the hydraulic error compensation value to correct the error in the hydraulic preliminary regression result, obtaining the final result, and avoiding error stacking in the overall calculation process, as shown in FIG. 3.

Wherein, the electrical power flow model and the corresponding error compensation model use the DHL-LSTM network, and the hydraulic model and the corresponding error compensation model use the SHL-LSTM network.

In the data preprocessing step, firstly, obtaining random data samples of electric load and thermal load through Monte Carlo simulation, then obtaining power flow result through the simulation, and generating a large number of the historical data samples, which comprises some critical values exceeding the safety settings of the system, screening out errors and exception data, arranging and finally obtaining training data for training networks. In order to facilitate network training, min-max normalization is performed on the data obtained, as follows:

$$y=(y_{max}-y_{min})*(x-x_{min})/(x_{max}-x_{min})+y_{min}.$$

Inputting the processed data samples into the above-mentioned data-driven electrical power flow model and data-driven hydraulic model, and optimizing the hyperparameters by using Adam algorithm. The data-driven flow is shown in FIG. 3.

Figure 4:
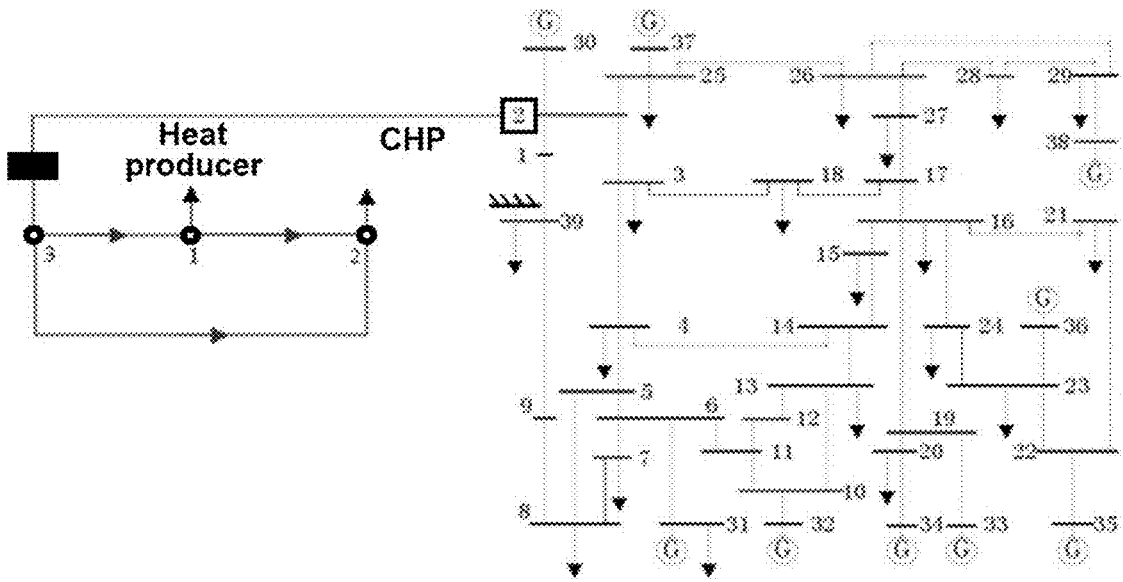
FIG. 4 is a schematic diagram of an example in embodiments of the present invention.

In the present embodiment, a small-scale electric-thermal integrated grid-connected system is taken as an example to prove the effectiveness of the solution, the thermal network is a 3-node loop network, the electrical power network is an IEEE-39-node distribution network, the thermal network and the electrical power network are connected together by the CHP unit, and the 39 nodes of the distribution network are connected to a large-scaled power grid. The electric-thermal interconnection system topology is shown in FIG. 4.

Figure 5:
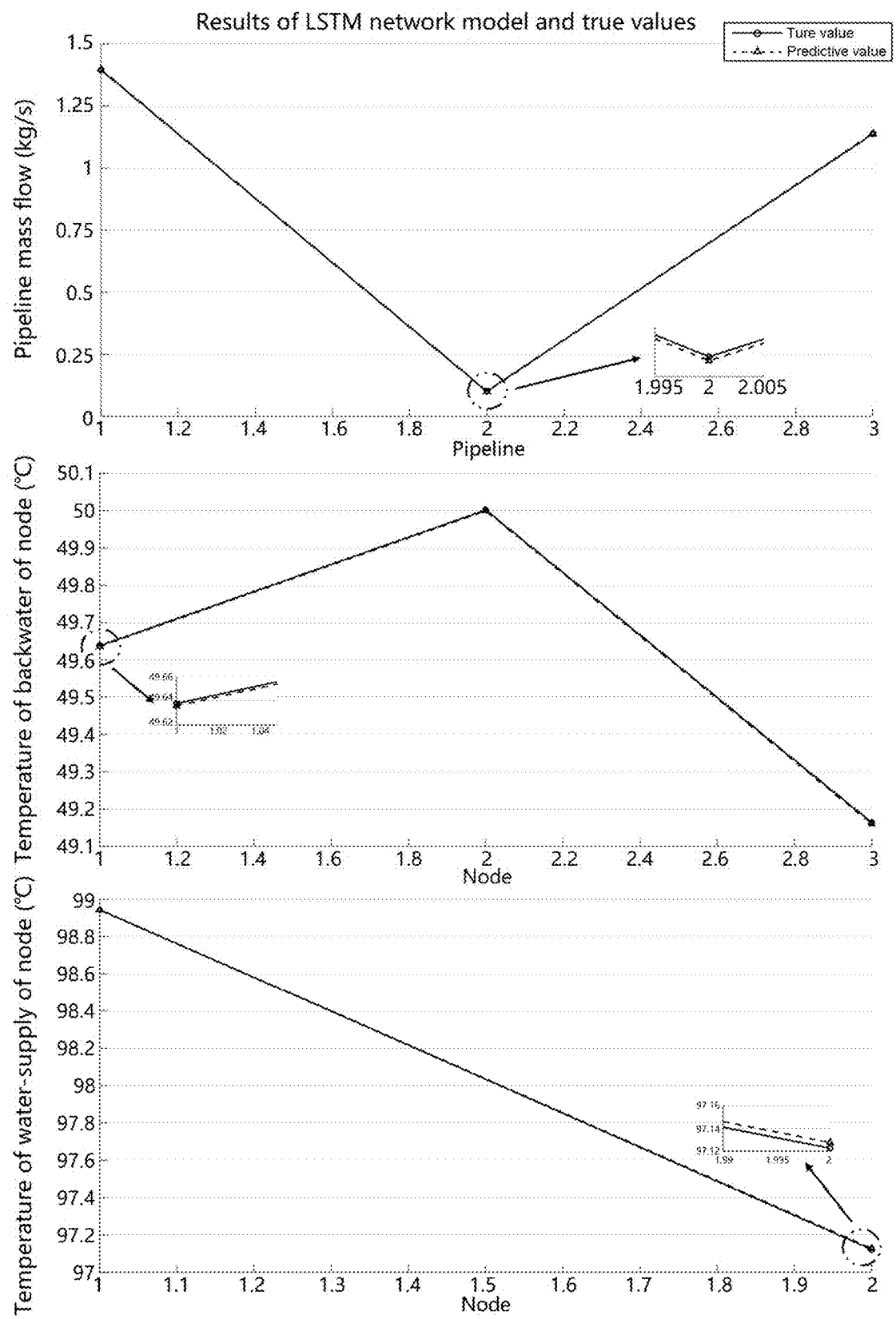
FIG. 5 is a diagram of comparison of energy flow result of a thermal network according to embodiments of the present invention.
Figure 6:
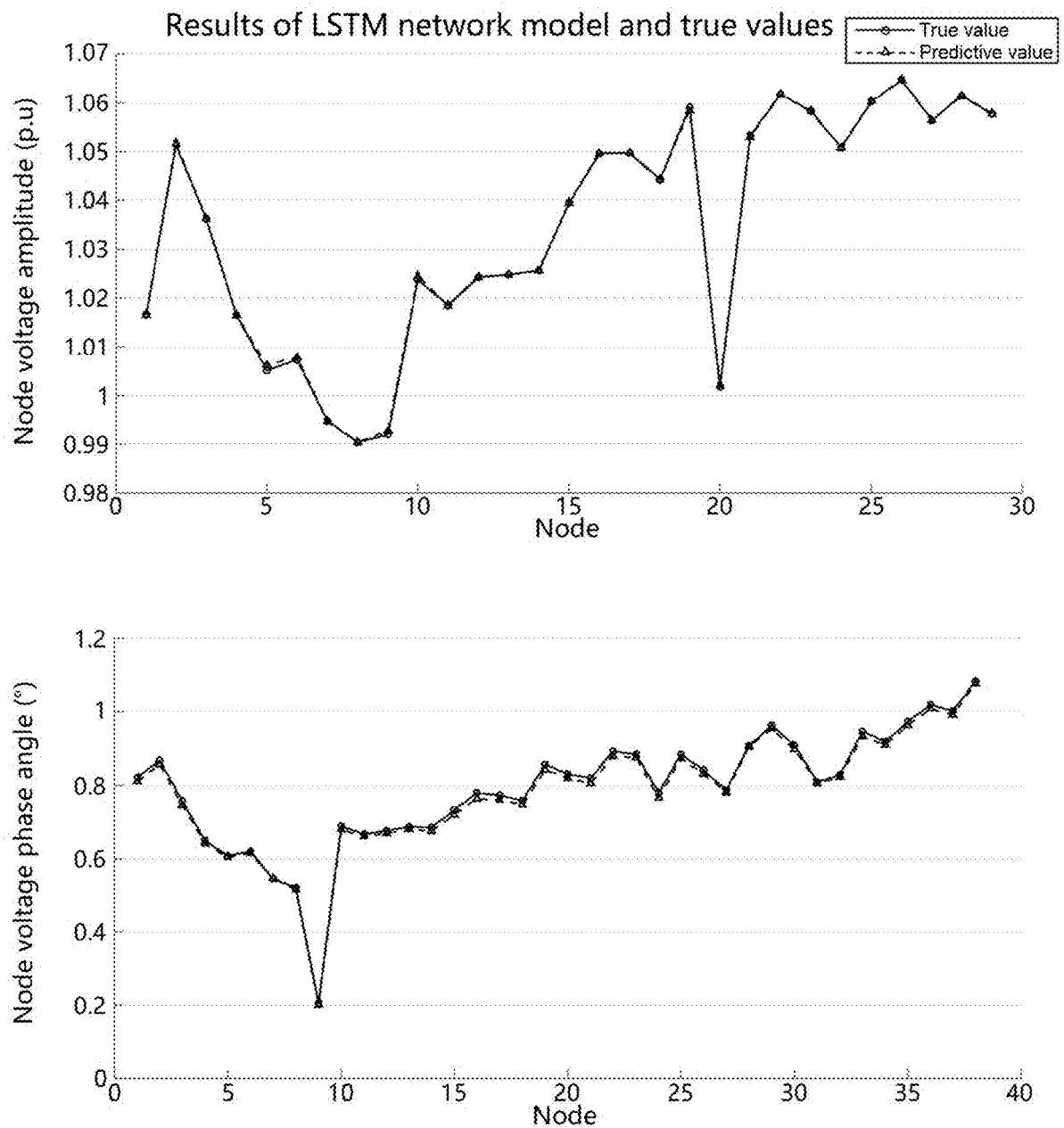
FIG. 6 is a diagram of comparison of energy flow result of an electrical power flow network according to embodiments of the present invention.

The calculation result the multi-energy flow calculation based on data-mechanism joint driving in electric-thermal interconnection system are shown in FIGS. 5 and 6, respectively. Wherein, FIG. 5 shows the comparison between the nonlinear regression fitting results of the energy flow of the thermal network and the true values, FIG. 6 shows the comparison between the nonlinear regression fitting results of the energy flow of the electrical power network and the true values. It can be seen that the regression fitting results can approach the true values as a whole.

The mean absolute error of the data-mechanism joint driving (denoted MAE here) is shown in Table 1, which comprises the mean absolute error values of the variables of the thermal network and the power network.

TABLE 1

Mean Absolute Error (MAE)

| Mean Absolute Error (MAE) | Variables of Power network | | Variables of Thermal Network | | |
|---|---|---|---|---|---|
| | Electrical Power Network | | | Temperature of | Temperature of |
| | Voltage (1 p.u) | Phase angle (°) | Mass flow (kg/s) | water supply (° C.) | backwater (° C.) |
| MAE | 3.46E−0.4 | 7.09E−03 | 2.58E−03 | 6.18E−03 | 1.90E−03 |

The data-driven part in the data-mechanism joint driving modeling method of the present embodiment directly calls the trained LSTM neural network model, and the mechanism-driven part is a linear model, so there is no convergence problem in the calculation process of the physical model multi-energy flow. The training time of LSTM neural network is closely related to the size of data samples, but its training is completed before the calculation of multi-energy flow, so the method based on data-mechanism joint driving takes a short time to calculate multi-energy flow and does not cause a large computational burden.

To sum up, the electric-thermal IES model of the present embodiment comprises an electrical power flow model, a hydraulic model and a thermal model, and a large amount of historical energy flow data is obtained by building an electric-thermal system simulation model, and data preprocessing is performed to lay a foundation for the data driving module. Based on the sharing mechanism of LSTM neural network, the nonlinear fitting regression of power flow model and hydraulic model is carried out by fully mining the correlation relationship between nodes under fixed topology. On this basis, the mechanism-driven linear thermal model is embedded. In order to further improve the accuracy of the model, error compensation technology is adopted. The regression error is trained and learned by LSTM, and then error correction is realized. It is proved by calculation examples that the present embodiment can realize nonlinear regression of the electrical power flow model and the hydraulic model with high accuracy, fully consider the coupling property inside the system, and avoid the situation that the convergence speed is slowed down when solving high nonlinear problems.

Those skilled in the art should understand that the examples of the present invention can be provided as methods, systems, or computer program products. Therefore, the present invention may take the form of hardware examples, software examples, or examples combining software and hardware aspects. Furthermore, the present invention may take the form of a computer program product implemented on one or more computer usable storage media (including but not limited to disk memory, CD-ROM, optical memory, etc.) containing computer usable program codes.

The present invention is described with reference to flowcharts and/or block diagrams of methods, devices (systems), and computer program products according to the examples of the present invention. It should be understood that each of the processes and/or boxes in the flowchart and/or block diagram, and the combination of the processes and/or boxes in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one process or multiple processes of the flowchart and/or one box or multiple boxes of the block diagram.

These computer program instructions may also be stored in a computer-readable memory capable of directing the computer or other programmable data processing apparatus to operate in a particular manner such that the instructions stored in such the computer-readable memory produce an article of manufacture comprising an instruction device that implements the function specified in one process or a plurality of processes of the flowchart and/or one box or a plurality of boxes of the block diagram.

These computer program instructions may also be loaded onto a computer or other programmable data processing device to enable a series of operational steps to be performed on the computer or other programmable device to generate a computer implemented process, so that instructions executed on a computer or other programmable device provide steps for implementing functions specified in one process or a plurality of processes of the flowchart and/or in one box or a plurality of boxes of the block diagram.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method for performing analysis and calculation of multi-energy flow for integrated energy system (IES), comprising:

establishing an electrical power flow model, a hydraulic model and a thermal model based on a structure of an IES, to form a preliminary model of the IES; wherein, the structure of the IES is of an electric-thermal interconnection system, comprises a thermal network, an electrical power network connected with a large power grid, and a CHP (combined heat and power) unit connecting the thermal network and the electrical power network together;

constructing a double-hidden-layer (DHL) long short-term memory (LSTM) neural network for nonlinear regression of the electrical power flow model, constructing a single-hidden-layer (SHL) LSTM neural network for nonlinear regression of hydraulic model, and finding optimal parameters of the DHL-LSTM neural network and the SHL-LSTM neural network by using Adam (Adaptive Moment Estimation);

training the electrical power flow model and the hydraulic model by using historical data, obtaining regression error data by using the trained electrical power flow model and hydraulic model; constructing error compensation regression models driven by the LSTM neural networks, for adding error compensations into the electrical power flow model and the hydraulic model in training, respectively;

obtaining a mechanism-driven linear thermal model by simplifying the thermal model;

embedding the mechanism-driven linear thermal model into the error-compensated hydraulic model and the error-compensated electrical power flow model respectively, to form a final model of the IES;

performing a multi-energy flow calculation and analysis by inputting parameter variables of a current load demand of the IES into the final model of the IES, outputting physical parameter values for current energy sources dispatching of the electrical power network and physical parameter values for current energy sources dispatching of the thermal power network; and providing, by a coupling device of the CHP unit in the electric-thermal interconnection system, thermal power to the thermal network according to the output physical parameter values for current energy sources dispatching of the thermal power network; then, calculating electrical power output by the coupling device according to a thermoelectric ratio of the CHP unit, providing the calculated electrical power to the electrical power network from a coupling node where the coupling device of the CHP unit connecting to the electrical power network, and dispatching electrical power energy from the large-scaled power grid to the electrical power network according to the output physical parameter values for current energy sources dispatching of the electrical power network, to balance energy of the electrical power network;

wherein, a process of adding error compensation comprises: dividing historical data into two parts: an electrical power part and a hydraulic part; constructing training sets and test sets respectively; independently training the electrical power flow model and the hydraulic model constructed by the neural networks, to obtain an electrical power regression model and a hydraulic regression model, respectively;

performing difference between preliminary regression results output by corresponding regression models and true values, to obtain electrical power regression error data and hydraulic regression error data; combining and arranging the electrical power regression error data and the hydraulic regression error data with the historical data into a data set, and dividing the data set in an error training set and an error test set of the electrical power and an error training set and an error test set of the hydraulic; and training error compensation regression models constructed by the neural networks, to obtain an electrical power error compensation regression model and a hydraulic error compensation regression model, respectively.

2. The method according to claim 1, wherein the electrical power flow model comprises an expression of active power deviation of node and an expression of reactive power deviation of node.

3. The method according to claim 1, wherein the hydraulic model comprises an expression of flow rate of node and an expression of flow rate of loop.

4. The method according to claim 1, wherein the thermal model comprises an expression of a thermal power vector consumed by or supplied to a node, an expression of a nodal temperature at an end of pipeline section, and an expression of a heating medium temperature of node.

5. The method according to claim 1, wherein a process of simplifying the thermal model comprises: ignoring heat loss in a transmission process, setting nodal temperatures of a water-supply network and a backwater network to constant values, to obtain the mechanism-driven linear thermal model.

6. The method according to claim 1, wherein a process of acquiring the historical data comprises: setting a random factor, generating random electric load values and thermal load values based on a Monte Carlo method, obtaining a flow result through simulation, deleting data exceeding a critical value of safety setting of system, and normalizing to form the historical data.

7. A non-transitory computer-readable storage medium, storing computer instructions thereon, wherein, when the computer instructions are executed by a processor, performing steps of the method according to claim 1.

8. An electronic device, comprising a memory, a processor, and computer instructions stored on the memory and running on the processor, wherein, when the computer instructions are executed by the processor, performing steps of the method according to claim 1.

* * * * *